US011132045B2

(12) United States Patent
Basir et al.

(10) Patent No.: US 11,132,045 B2
(45) Date of Patent: *Sep. 28, 2021

(54) POWER MANAGEMENT SYSTEM (71) Applicant: APPY RISK TECHNOLOGIES LIMITED, Cheshire (GB)

(72) Inventors: Otman A. Basir, Waterloo (CA); William Ben Miners, Guelph (CA); Vladimir Filipov, Waterloo (CA)

(73) Assignee: Appy Risk Technologies Limited, Cheshire (GB)

( * ) Notice: Subject to any disclaimer, the term of this patent is extended or adjusted under 35 U.S.C. 154(b) by 505 days.

This patent is subject to a terminal disclaimer.

(21) Appl. No.: 15/588,329

(22) Filed: May 5, 2017

(65) Prior Publication Data
US 2018/0032121 A1 Feb. 1, 2018

Related U.S. Application Data

(63) Continuation of application No. 12/508,789, filed on Jul. 24, 2009, now Pat. No. 9,652,023.
(Continued)

(51) Int. Cl.
*G06F 1/32* (2019.01)
*H04W 52/02* (2009.01)
*G06F 1/3209* (2019.01)
*G06F 1/3203* (2019.01)
*H04M 1/60* (2006.01)
*H04M 1/72484* (2021.01)
*H04M 1/27* (2006.01)
(Continued)

(52) U.S. Cl.
CPC .......... *G06F 1/3209* (2013.01); *G06F 1/3203* (2013.01); *H04M 1/6091* (2013.01); *H04M 1/72484* (2021.01); *H04W 52/0251* (2013.01); *H04M 1/271* (2013.01); *H04M 1/72433* (2021.01); *H04M 1/72436* (2021.01); *H04M 2250/10* (2013.01); *H04M 2250/74* (2013.01); *Y02D 30/70* (2020.08)

(58) Field of Classification Search
CPC .. G06F 1/3203; G06F 1/3209; H04M 1/6091; H04M 1/72597; H04M 1/271; H04M 1/7255; H04M 1/72552; H04M 2250/10; H04M 2250/74; H04W 52/0251; Y02D 70/144; Y02D 70/164; Y02D 70/166; Y02D 70/1224; Y02D 70/142
See application file for complete search history.

(56) References Cited

U.S. PATENT DOCUMENTS

6,055,479 A * 4/2000 Kirkhart ............... G06F 1/3203
 701/490
6,148,212 A * 11/2000 Park ....................... B60R 25/04
 340/426.2
(Continued)

*Primary Examiner* — Stephen Holwerda
(74) *Attorney, Agent, or Firm* — Carlson, Gaskey & Olds, P.C.

(57) ABSTRACT

A vehicle communication system facilitates hands-free interaction with a mobile device in a vehicle or elsewhere. Users interact with the system by speaking to it. The system processes text and processes commands. The system supports wireless technology for hands-free use. The system handles telephone calls, email, and SMS text messages. The user can customize the device via a user profile stored on an Internet web server. The system also includes a plurality of power conservation features.

13 Claims, 3 Drawing Sheets

Related U.S. Application Data

(60) Provisional application No. 61/083,291, filed on Jul. 24, 2008.

(51) Int. Cl.
*H04M 1/72433* (2021.01)
*H04M 1/72436* (2021.01)

(56) References Cited

U.S. PATENT DOCUMENTS

| | | | | |
|---|---|---|---|---|
| 7,323,970 B1* | 1/2008 | Murray | ............ | H04W 52/0274 340/426.12 |
| 2001/0016918 A1* | 8/2001 | Alexander | ................ | G06F 1/26 713/323 |
| 2003/0181169 A1* | 9/2003 | Mutoh | ................... | B60R 25/24 455/99 |
| 2003/0227390 A1* | 12/2003 | Hung | ................ | G01R 31/3648 340/636.1 |
| 2004/0198466 A1* | 10/2004 | Walby | ................... | G07C 5/008 455/574 |
| 2005/0066207 A1* | 3/2005 | Fleck | ................... | G06F 1/3203 713/320 |
| 2005/0073137 A1* | 4/2005 | Ooyabu | ................ | B60R 21/013 280/735 |
| 2006/0211400 A1* | 9/2006 | Bauman | ................ | H04M 11/007 455/343.1 |
| 2007/0042812 A1* | 2/2007 | Basir | .................. | H04M 1/6091 455/569.2 |
| 2007/0293991 A1* | 12/2007 | Pasquin | ................. | B60R 16/03 701/1 |

* cited by examiner

POWER MANAGEMENT SYSTEM

The application claims priority to U.S. Provisional Application No. 61/083,291 which was filed on Jul. 24, 2008.

BACKGROUND OF THE INVENTION

This application relates to power management, and more particularly to a power management aspect of a system for managing and communicating information while in a vehicle.

Power management systems are used to prolong battery life and minimize wasted energy. However, a positive user experience requires that power saving measures are minimally intrusive.

SUMMARY OF THE INVENTION

An example vehicle communication system includes a mobile communication device and a control unit in a vehicle. The control has an OFF state, an ON state, and a LOW POWER state. The control unit includes a wireless communication module operable to communicate wirelessly with the mobile communication device, and a power management module operable to command the control unit to enter the ON state in response to each of a vehicle ignition event, a vehicle running condition, an incoming wireless command signal, and environmental stimuli.

An example method for controlling power consumption in a vehicle communication system includes the steps of (a) monitoring global positioning system-based positional movement of a control unit in a vehicle, the control unit having an OFF state, an ON state, and a LOW POWER state, and the control unit being operable to communicate wirelessly with a mobile communication device, (b) monitoring accelerometer-based positional movement of the control unit, and (c) entering the ON state from the LOW POWER state in response to detection of movement step (a), said step (b), or both.

In another feature, an example method for controlling power consumption in a vehicle communication system includes the steps of (a) monitoring vehicle power bus activity, (b) identifying a power spike on the vehicle power bus as a vehicle ignition start condition, (c) identifying a repeated pattern of signal noise on the vehicle power bus as a vehicle running condition, and (d) commanding a control unit to enter an ON state in response to step (a), said step (b), or both. The control unit is operable to communicate wirelessly with a mobile communication device.

These and other features of the present invention can be best understood from the following specification and drawings, the following of which is a brief description.

DETAILED DESCRIPTION OF THE PREFERRED EMBODIMENT

Figure 1:
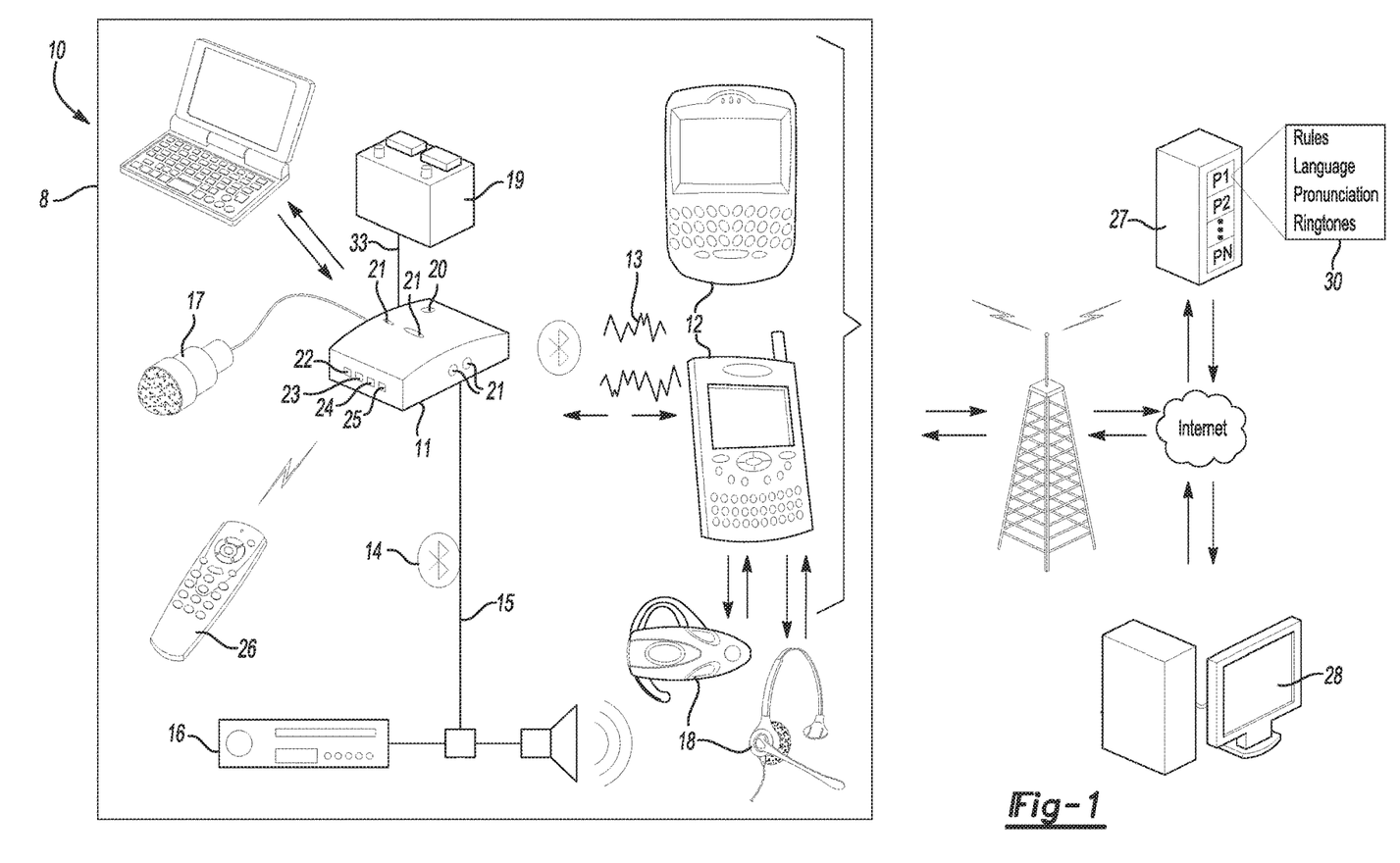
FIG. 1 schematically illustrates a communication system according to one embodiment of the present invention.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) wireless communication standard or any other wireless standard (e.g., Wi-Fi, RFID, etc.) to communicate wirelesly with a cell phone, PDA, or other mobile communication device 12 (hereinafter "mobile device"). All data 13 is encrypted prior to transmission. The audio output of the control unit 11 is transmitted either wireles sly 14 or through a direct, wired connection 15 to the vehicle's car stereo 16. The audio input for the control unit 11 is obtained either through a directly connected microphone 17, through an existing vehicle hands-free system, or wirelessly though a headset 18 connected to the mobile device 12.

The control unit 11 connects to the vehicle's battery 19 for power via a vehicle power bus 33. An AC adapter is available for use at home or in the office. For portable use in other vehicles, an optional "Y" or pass-through cable is available to plug into a cigarette lighter accessory socket for power. Use of the optional "Y" cable can provide a non-intrusive and easy to install way to connect to the vehicle power bus 33. As will be described below, the control unit 11 has an ON state, an OFF state, and a LOW POWER state, and includes a variety of power conservation features relating to transitioning between these states. In one example the control unit 11 includes it's its own battery, and only uses the vehicle battery 19 for recharging.

The control unit 11 contains a recessed button 20 which enables the driver to do the following: register new or replacement remotes; pair the device with a new mobile device 12; and clear all preferences and reset the device to its factory default settings. The control unit 11 also has a set of four status lights 21 which display the following information: power and system health (e.g., the power ON, OFF, and LOW POWER states mentioned above), vehicle connection status and activity, mobile device connection status and activity, and information access and general status. In one example the status lights 21 are light-emitting diodes ("LEDs").

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the mobile device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8, on the mobile device 12, or on the control unit 11 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a public mode, even if other occupants are in the vehicle 8.

Figure 2:
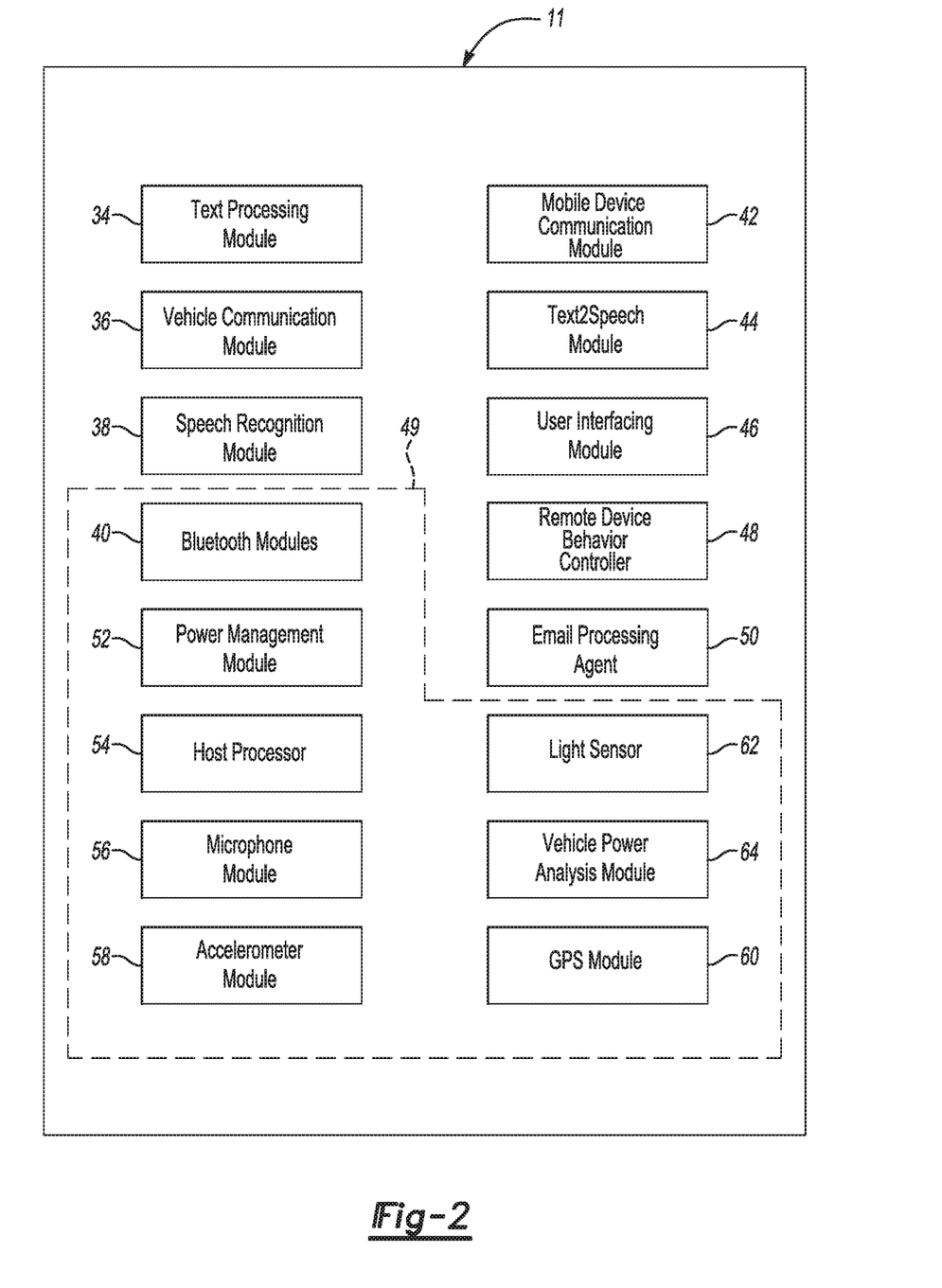
FIG. 2 schematically illustrates some of the components of the control unit of the communication system of FIG. 1.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information, using, for example, GPS module 60 as shown in FIG. 2). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features; and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (e.g. similar to connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The driver stores his or her settings for the device in their settings profile 30. This profile 30 may be stored in a database on an Internet server 27. The control unit 11 utilizes the Internet access provided by the driver's mobile device 12 to download the driver's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

The control unit 11 also includes a power management module 52, a host processor 54, a microphone module 56, an accelerometer module 58, a global positioning system ("GPS") module 60, a light sensor 62, and a vehicle power analysis module 64 that along with the Bluetooth modules 40 collectively correspond to a power management system 49. In one example, the host processor 54 acts as the heart of the control unit 11, and is in communication with each of the modules 34-52 and 56-60 shown in FIG. 2.

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (e.g., 18r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (e.g., "I'm in the car call me at 'number,'" or "I'm in the car, I will reply as soon as I can"). New emails can also be created and sent as a voice recording in the form of a .wav or .mp3 file. The driver is also provided the option of calling the sender of the email on the phone using existing contact information in the address book, or responding to meeting requests and calendar updates (e.g. with a calendar program, such as the Outlook calendar program). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the driver is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (e.g. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (e.g. .wav, .mp3), HTML (e.g. encoded emails and web sites), plain text portions of the Word word-processing program (or other word-processing program) and PowerPoint files (or other presentation program files), Adobe or other Portable Document Format (PDF) files, OpenDocument or other file formats, and compressed and/or encoded attachments of the above formats (e.g. .zip).

Third, the control unit 11 provides remote access to information. This includes existing news sources (e.g. existing RSS feeds) and supported websites. This also includes subscription to value-added services including: weather, custom alerts (e.g. stock price triggers), traffic conditions, personalized news, e-books (not limited to audio books, but any e-book), personalized audio feeds, and personalized image or video feeds for passengers.

Fourth, the device provides environment and location awareness. This includes current location and navigation information, local weather conditions, vehicle status, and relevant location-specific information (e.g. where is "work", where is "home?", etc.).

Personalization

Another feature in the present invention is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (e.g., email addresses, web site URLs) with simple names and words. The driver can also choose to hear only select information when a new email arrives (e.g., just the sender name, or the sender and subject, or a quick summary). Email "ring tones" are also available for incoming emails based on sender or specific keywords. Prepared text or voice replies can be used to send frequently used responses (e.g. "I'm in transit right now"). Some prepared quick-responses may be used to automatically forward an email to a pre-selected recipient such as an administrative assistant. The driver can also set up both email address configuration and multiple email address rules (e.g. use "me@ work.com" when replying to emails sent to "me@work.com," but use "me@mobile.com" when composing new emails).

The driver can also customize notification. This includes prioritizing emails and phone calls based on caller or sender and subject (e.g. never read emails from Ben out loud, or if an email arrives from George, it should be read before others). The driver can also limit the amount of notifications received (e.g., set minimum time between notifications, or maximum number of emails read in a short period of time).

Time-sensitive rules in the profile 30 may include options such as "don't bother me in the morning," or "only notify me about incoming email between these hours." The driver can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (e.g. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (e.g., IMS, USB).

Information about specific words or phrases can be used to enhance both speech recognition performance and text-to-speech performance, and this includes context sensitive shortcuts. For example, nicknames should be expanded into an email address if the driver is dictating an email. In addition, email addresses should be expanded to a common name when found. The driver can also set custom voice prompts or greetings.

The device also features multiple user support, wherein multiple people can share the same device. The device automatically identifies each person by their mobile device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The driver could also use the control unit 11 through an advanced wireless audio/visual system, including such features as streaming music and providing image content (e.g. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the driver can expand the functionality of the device by attaching such items as a USB GPRS/EDGE/3G device for direct mobile access without a separate mobile device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (e.g. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (e.g. similar to connecting a digital camera or GPS unit directly to a computer).

Power Management System

As described above, the control unit 11 has an ON state, an OFF state, and a LOW POWER state, and the control unit also includes a power management system 49 operable to facilitate transitions between these states. The power management system 49 seeks to maintain an ON state when a driver is present in the vehicle 8, and to enter the LOW POWER or OFF state when driver absence is detected to conserve power.

In the ON state each of the items and modules 34-60 (see FIG. 2) are ON and responsive to inputs. In the LOW POWER state the power management module 52, Bluetooth modules 40, microphone module 56, accelerometer module 58, and GPS module 60 light sensor 62 and vehicle power analysis module 64 remain ON, but the remaining components of FIG. 2 (e.g., modules 34, 36, 38, 42, 44, 46, 48, 50, 54) are turned OFF. In the OFF state the power management module 52 and vehicle power analysis module 64 remain ON, but the remaining components of FIG. 2 (e.g. 34, 36, 38, 40, 42, 44, 46, 48, 50, 54, 56, 58, 60 and 62) are turned OFF.

Activity/Driver Presence Detection

The control unit 11 is able to redundantly detect driver presence in the vehicle 8 through a variety of detection features. Bluetooth modules 40 are operable to detect Bluetooth connection attempts, and to indicate driver presence in response to a connection attempt. In one example the Bluetooth modules 40 include a first Bluetooth module operable to communicate with mobile device 12 via Bluetooth connection 13, and a second Bluetooth module operable to communicate with the vehicle (e.g. vehicle stereo 16) via Bluetooth connection 14. In one example the Bluetooth modules 40 are also operable to detect other radio frequency ("RF") signals (e.g., WiFi, RFID, etc.).

The control 11 unit can also detect driver presence through a sound input, received into microphone 17, which is in communication with microphone module 56, and which as described above is not limited to its illustrated hardwired connection to the control unit 11. The microphone 17 could also correspond, for example, to a microphone built into the control unit 11 or mobile device 12.

The control unit 11 can also detect driver presence through light sensor 62. In one example the light sensor 62 interprets a sudden change in light intensity as the vehicle 8 turning on a cabin light in response to a vehicle door being opened, and indicates a driver presence in response to the sudden change in light. As another example, if a car exited a dimly or non-lighted garage, the light sensor 62 could indicate driver presence in response to the change in lighting upon exit of the garage.

The control unit 11 can also detect driver presence through detection of movement of the vehicle 8 via accelerometer module 58 or GPS module 60. The accelerometer module 58 includes an accelerometer and indicates driver presence in response to movement of the actual control unit 11. The GPS module 60 is operable to receive and transmit GPS data and indicates driver presence in response to a detected GPS position change.

Figure 3:
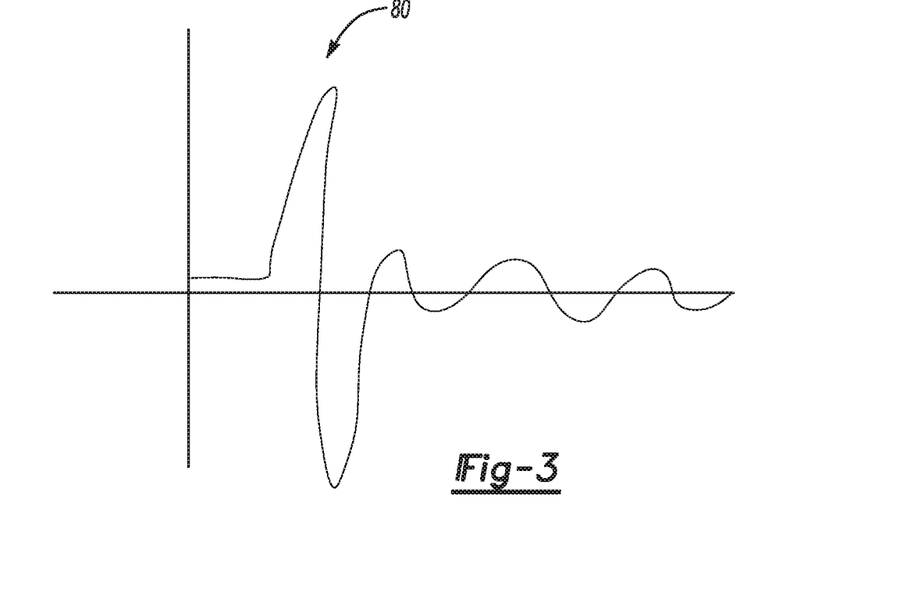
FIG. 3 schematically illustrates power bus noise corresponding to a vehicle ignition start condition.
Figure 4:
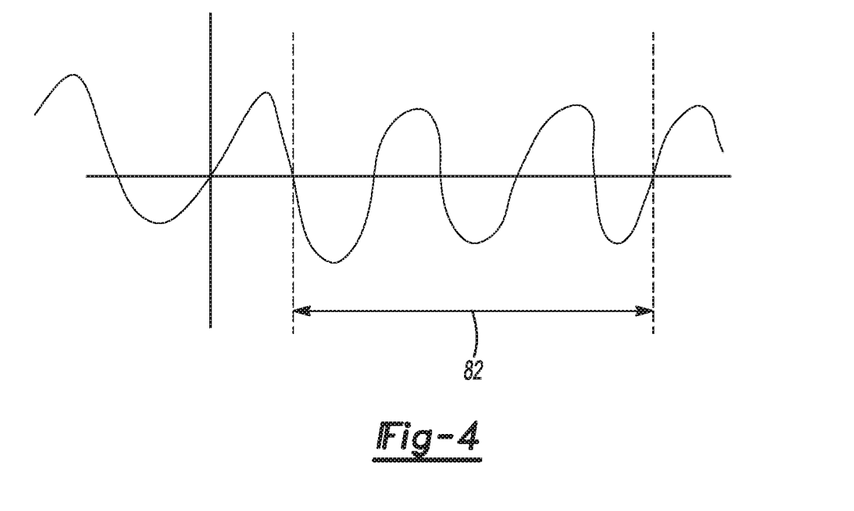
FIG. 4 schematically illustrates power bus noise corresponding to a vehicle running condition.

The control unit 11 can also detect driver presence using a vehicle power analysis module 64 that monitors activity on vehicle power bus 33. The module 64 identifies a power spike on the vehicle power bus 33 (see spike 80 in FIG. 3) as a vehicle ignition start condition. The module 64 also identifies a repeated pattern of signal noise (see repeated signal 82 of FIG. 4) on the vehicle power bus 33 as a vehicle running condition. In response to either the spike 80 or repeated signal 82, the vehicle power analysis module 64 notifies the power management module 52 that driver presence has been detected. In one example the control unit 11 can analyze the vehicle power bus 33 by non-intrusively and removably connecting to a cigarette lighter accessory socket, thus avoiding the necessity of a hardwired connection directly into the power bus that is required for some systems (e.g. remote keyless entry systems).

Thus, the control unit 11 is operable to redundantly detect driver presence through a variety of detection features. The redundancy ensures that if one detection method fails (e.g. ignition detection does not detect an ignition) that another method will serve as a backup (e.g. GPS position change detected).

Power State Transitions

The control unit 11 enters the ON state from the OFF state in response to a button being pressed (e.g., recessed button 20) and in response to vehicle power analysis module 64 detecting a vehicle ignition event or a vehicle running condition.

The control unit 11 enters the ON state from the LOW POWER state in response to a button being pressed (e.g., recessed button 20), in response to vehicle power analysis module 64 detecting a vehicle ignition event or a vehicle running condition, in response to detection of an RF signal (e.g., Bluetooth connection attempt) and in response to environmental stimuli (e.g., sudden light change, noise such as human speech via microphone 17).

The control unit 11 enters the LOW POWER state from the ON state in response to one of several conditions. If driver presence is no longer detected (e.g., no vehicle activity or movement, no sound, no light changes, etc.) and a predefined period of time elapses (e.g., 1 hour), the control unit 11 will enter the LOW POWER state from the ON state. If the vehicle 8 is determined to be OFF (e.g., no ignition or running condition determined by vehicle power analysis module 64), and a predefined period of time elapses (e.g. 1 hour), the control unit 11 will enter the LOWER POWER state from the ON state. Also, if a level, such as voltage, of the vehicle battery 19 drops below a predetermined safe level threshold required to restart the vehicle 8, the control unit 11 will enter the LOW POWER state from the ON state.

The control unit 11 enters the OFF state from the LOW POWER state in response to a predetermined period of inactivity (e.g., 4 days), or in response to a level (e.g. voltage) of the vehicle battery 19 dropping below a predetermined safe level threshold required to restart the vehicle 8.

The control unit 11 enters the OFF state from the ON state in response to detection that the host processor 54 is experiencing a permanent error (as described below).

LED Control

As described above, the control unit 11 includes a plurality of status lights 21, which may include, but are not limited to, LEDs. Light sensor 62 is operable to detect an amount of ambient light, and the control unit 11 is operable to adjust an intensity of the status lights 21 in response to an amount of detected ambient light. For example, if the light sensor 62 detected a low lighting condition (e.g., vehicle in garage or vehicle in tunnel), the status lights 21 could be adjusted to a lower intensity, and if the light sensor 62 detected a full daytime brightness the status lights 21 could be adjusted to a higher intensity.

In one example, the intensity of status lights is adjusted over a predetermined time period (e.g. 15 seconds) to avoid flickering. For example, if the vehicle 8 entered a tunnel or passed beneath an overpass the intensity of status lights 21 could be adjusted over the predetermined time period to avoid the status lights 21 quickly dimming and then immediately returning to full intensity when the vehicle 8 exited the tunnel or overpass.

In one example, when the control unit 11 is in the LOW POWER state one of the status lights 21 pulses ON and OFF repeatedly at a predefined time (e.g. 3 seconds) to indicate that the control unit 11 is in the LOW POWER state in response to a control signal from the power management module 52.

In one example, upon entering the ON state the power management module 52 relinquishes control of the status lights 21 to the host processor 54, at which time the host processor 54 maintains and performs all control of the status lights 21.

Failsafe Features

The host processor 54 sends periodic communication signals to the power management module 52 to provide a notification that the host processor 54 is operational. If the control unit 11 is in the ON state and the power management module 52 receives no commands from the host processor 54 after a predetermined timeout interval, the power management module 52 will assume that the host processor 54 is experiencing a transient error, and the power management module 52 will power cycle, or "reboot", the host processor 54 and then wait for the predetermined timeout interval.

If this process is repeated a predefined number of times (e.g., 3 times), and still no communication signal is received from the host processor 54 after a subsequent timeout interval, then the power management module 52 assumes that there is a permanent error in the host processor 54, and turns the control unit 11 to the OFF state.

Upgrade Capability

As discussed above, the control device 11 has multiple USB ports 22 that may be used, for example, to permit future expansion, upgrades, and add-on features. As part of this upgradable functionality, the components of the power management system 49 are upgradeable.

During an upgrade, the power management module 52 will not prevent the host processor 54 from powering up. For example, if power is lost during an upgrade of the power management module 52 and the power management module 52 becomes corrupted, the control unit 11 will still be operable to power up so that the upgrade can be re-attempted.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for controlling power consumption in a vehicle communication system including the steps of:
    a) monitoring global positioning system-based positional movement of a control unit in a vehicle in a LOW POWER state, the control unit having an OFF state, an ON state, and the LOW POWER state, and the control unit being operable to communicate wireles sly with a mobile communication device;
    b) monitoring accelerometer-based positional movement of the control unit in the LOW POWER state; and
    c) entering the ON state from the LOW POWER state in response to detection of movement in said step (a), said step (b), or both.

2. The method of claim 1 wherein said step c) includes entering the ON state from the LOW POWER state in response to detection of movement in said step (a).

3. The method of claim 1 wherein said step c) includes entering the ON state from the LOW POWER state in response to detection of movement in said step (b).

4. The method of claim 1 wherein the mobile communication device is a cell phone.

5. A method for controlling power consumption in a vehicle communication system including the steps of:
    a) monitoring vehicle power bus activity while a control unit is in a LOW POWER state;
    b) identifying a power spike on the vehicle power bus as a vehicle ignition start condition;
    c) identifying a repeated pattern of signal noise on the vehicle power bus as a vehicle running condition; and
    d) commanding the control unit to enter an ON state in response to said step (b), said step (c), or both, the control unit being operable to communicate wirelessly with a mobile communication device.

6. The method of claim 5, wherein said step (a) is performed via a vehicle lighter socket.

7. The method of claim 5, further including the step of:
    e) receiving a wireless command signal via at least one wireless communication module; and
    f) commanding the control unit to enter the ON state from a LOW POWER STATE in response to said step (e).

8. The method of claim 5 further including the step of:
    e) commanding the control unit to enter the OFF state in response to a predetermined period of inactivity.

9. The method of claim 5 wherein said step d) includes commanding the control unit to enter an ON state from the LOW POWER state in response said step (b).

10. The method of claim 9 wherein said step d) includes commanding the control unit to enter an ON state from the LOW POWER state in response said step (c).

11. The method of claim 10 wherein the mobile communication device is a cell phone.

12. A method for controlling power consumption in a vehicle communication system including the steps of:
   a) monitoring global positioning system-based positional movement of a control unit in a vehicle in a LOW POWER state, the control unit having an OFF state, an ON state, and the LOW POWER state, and the control unit being operable to communicate wireles sly with a mobile communication device;
   b) monitoring accelerometer-based positional movement of the control unit in the LOW POWER state;
   c) monitoring vehicle power bus activity while the control unit is in a LOW POWER state;
   d) identifying a power spike on the vehicle power bus as a vehicle ignition start condition;
   e) identifying a repeated pattern of signal noise on the vehicle power bus as a vehicle running condition;
   f) detecting environmental stimuli, wherein the environmental stimuli includes light or sound;
   g) entering the ON state from the LOW POWER state in response to detection of movement in said step (a) or in said step (b), or in response to said step d), or in response to said step e), or in response to said step f).

13. The method of claim 12 wherein the mobile communication device is a cell phone.

* * * * *